United States Patent
Ohman

(10) Patent No.: US 7,377,807 B2
(45) Date of Patent: May 27, 2008

(54) MODULAR POWER DISTRIBUTION APPARATUS USING CABLES WITH GUARDED CONNECTORS

(75) Inventor: Ove Ohman, Espoo (FI)

(73) Assignee: Eaton Corporation, Cleveland, OH (US)

( * ) Notice: Subject to any disclaimer, the term of this patent is extended or adjusted under 35 U.S.C. 154(b) by 4 days.

(21) Appl. No.: 11/199,974

(22) Filed: Aug. 9, 2005

(65) Prior Publication Data

US 2007/0037420 A1    Feb. 15, 2007

(51) Int. Cl.
*H01R 13/72* (2006.01)
(52) U.S. Cl. .................... 439/535; 439/135
(58) Field of Classification Search ........ 439/535, 439/540.1, 135
See application file for complete search history.

(56) References Cited

U.S. PATENT DOCUMENTS 4,166,934 A * 9/1979 Marrero .................. 200/51 R
6,109,958 A * 8/2000 Ke .......................... 439/535
6,200,159 B1 * 3/2001 Chou ....................... 439/535
6,653,562 B2 * 11/2003 Kochanski et al. ........... 174/50
6,666,712 B1 * 12/2003 Kramer .................... 439/501

FOREIGN PATENT DOCUMENTS

DE    298 17 241 U1    2/2000
EP    1 592 106 A1    11/2005
WO    WO 03/007449 A1    1/2003

* cited by examiner

Primary Examiner—Gary F. Paumen
(74) Attorney, Agent, or Firm—Myers Bigel Sibley & Sajovec PA

(57) ABSTRACT

A power distribution system includes an uninterruptible power supply (UPS) and a power distribution unit including a plurality of interconnected and/or interconnectable guarded connectors coupled to an output of the UPS. Each of the guarded connectors is configured to mate with a guarded connector of a power distribution cable. The power distribution unit may further include a load terminal connected or connectable to the guarded connectors.

21 Claims, 5 Drawing Sheets

US 7,377,807 B2

MODULAR POWER DISTRIBUTION APPARATUS USING CABLES WITH GUARDED CONNECTORS

BACKGROUND OF THE INVENTION

The present invention relates to power distribution apparatus and methods and, more particularly, to modular power distribution apparatus and methods.

In some power distribution systems, uninterruptible power supplies (UPSs) and other power sources may be coupled to multiple loads and to one another in various configurations. Custom installation is typically used to construct such systems, e.g., wiring between UPSs, switches, circuit breakers, power distribution units and other devices is installed by a professional electrician using conventional techniques. Such installation typically requires de-energizing while an electrician runs wiring between the components. Maintenance and repair in such systems typically requires similar techniques.

SUMMARY OF THE INVENTION

In some embodiments of the present invention, a power distribution system includes an uninterruptible power supply (UPS) and a power distribution unit including a plurality of interconnected and/or interconnectable guarded connectors coupled to an output of the UPS, wherein each of the guarded connectors is configured to mate with a guarded connector of a power distribution cable. The power distribution unit may further include a load terminal connected or connectable to the guarded connectors.

In some embodiments, the UPS and the power distribution unit include respective first and second assemblies, and the system further includes a cable including a connector connected to a connector of the first assembly and a guarded connector connected to a guarded connector of the second assembly. The connector of the first assembly may include a guarded connector and the connector of the cable connected to the connector of the first assembly may include a guarded connector connected to the guarded connector of the first assembly.

In other embodiments of the invention, the system further includes a cable coupling the output of the UPS to one of the guarded connectors of the power distribution unit. The UPS may include a plurality of UPSs, and the cable may include a plurality of cables coupling respective ones of the plurality of UPSs to the power distribution unit, wherein a respective one of the cables includes a guarded connector connected to a respective one of the guarded connectors of the power distribution unit.

In further embodiments of the present invention, the power distribution unit includes a first power distribution unit, and the system further includes a second power distribution unit including a plurality of interconnected and/or interconnectable guarded connectors. The system further includes a cable including a guarded connector connected to one of the guarded connectors of the first power distribution unit and a guarded connector connected to one of the guarded connectors of the second power distribution unit.

DETAILED DESCRIPTION OF EXEMPLARY EMBODIMENTS

Figure 1:
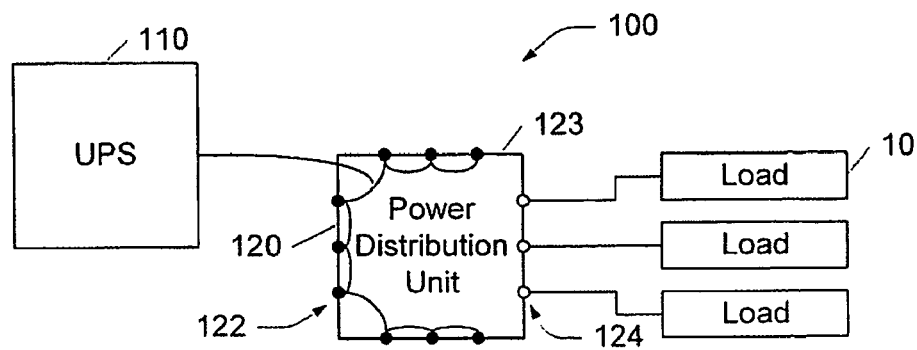
FIGS. 1-7 illustrate modular power distribution apparatus and configurations thereof according various exemplary embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "includes," "including" and/or "including," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention arise from a realization that it may be possible to safely connect and disconnect power distribution equipment and loads without removing power from the loads by using a modular architecture in which power distribution equipment is connected by cables using guarded connectors. Thus, for example, a power distribution system in some embodiments of the present invention may include a power distribution unit that may be coupled to one or more UPSs by cables with guarded connectors. The power distribution unit may serve a group of loads. One or more of the UPSs may be removed and replaced without interrupting power to the loads. This architecture may also make it possible to easily configure bypass or maintenance feeds and other operations that conventionally involve de-energizing and use of highly skilled installation personnel. As used herein, a "guarded" connector is a connector configured to inhibit or prevent contact with live conductors of the connector when the connector is disconnected from a mating connector.

FIG. 1 illustrates a power distribution system 100 according to some embodiments of the present invention. The system 100 includes a power distribution unit 120 including a plurality of interconnected and/or interconnectable guarded connectors 122 supported by a frame 123. The guarded connectors 122 are electrically coupled to an output of an uninterruptible power supply 110, thus providing means by which other power sources and/or power distribution units may be connected without requiring de-energizing and/or the use of involved installation techniques, such as inserting or removing wires at screw terminals or buss clamps. In some embodiments, the guarded connectors 122 may be fixedly interconnected, as illustrated in FIG. 1, while in other embodiments, some or all of the guarded connectors 122 may be interconnectable, for example, may be coupled by switches, breakers or other coupling devices that allow for selective interconnection of the connectors 122. As shown in FIG. 1, the power distribution unit 120 may also include one or more load terminals 124 configured to be connected to one or more loads 10. The load terminals 124 may be electrically connected or connectable (e.g., through intermediary selective coupling devices, such as switches or breakers) to all or some of the guarded connectors 122. The load terminals 124 may include, for example, standard power outlets, such as IEC standard outlets or NEMA standard outlets, connectors or other connection means.

The guarded connectors 122 are configured to impede or prevent contact of personnel and/or objects with voltage-carrying parts (i.e., conductors) when disconnected. For example, the guarded connectors 122 may be configured such that, when certain ones of the guarded connectors 122 of the power distribution unit 120 are not connected to a power source or other distribution component, the connectors 122 do not present exposed conductors that could contact personnel or equipment. The guarded connectors 122 may include as many conductors (poles) as required for the application, e.g., number of phases and/or current capacity. Paralleled conductors may also be used to increase current capacity of the connectors 122. It is also desirable that the guarded connectors 122 be keyed such that connections are constrained to the proper polarity. Examples of guarded connectors that may be used in some embodiments of the present invention are the SBE®, SBO®, and SBS™ "finger proof" connectors produced by Anderson Power Products, described at www.andersonpower.com.

Figure 2:
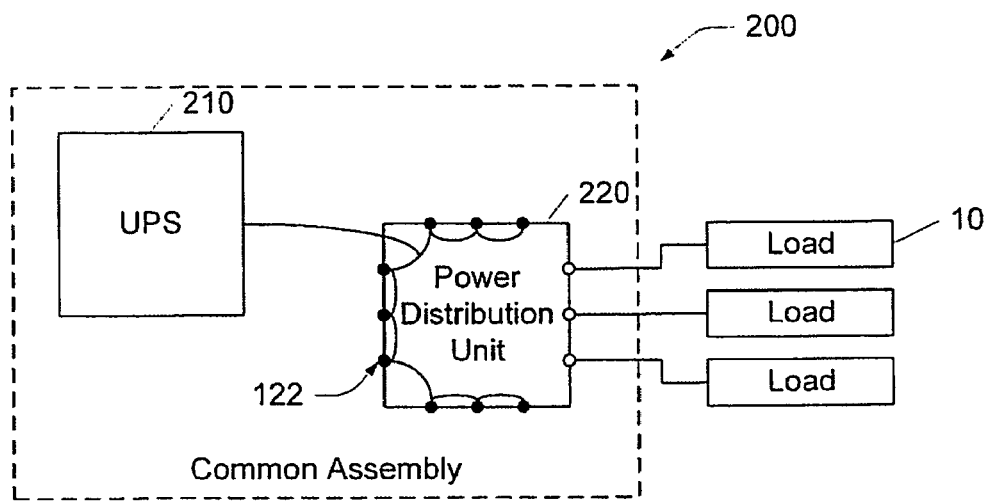

A UPS or other power source may be coupled to guarded connectors of a power distribution unit in any of a number of different ways according to various embodiments of the present invention. For example, as shown in FIG. 2, a UPS 210 and a power distribution unit 220 may be integrated in a common assembly 200, such that power is provided from the UPS to interconnected guarded connectors 122 of the power distribution unit 220 via bussbars, wires, cables, or other conduction means, which also may include switches, breakers, or other selective coupling devices. In such an integrated assembly 200, the guarded connectors 122 may provide a hot-pluggable means for, for example, connecting other power sources in parallel with the UPS 210 and/or for connecting other power distribution units. As shown, the power distribution unit 220 may also include one or more load terminals 124, e.g., standard receptacles, for connection of loads 10.

Figure 3:
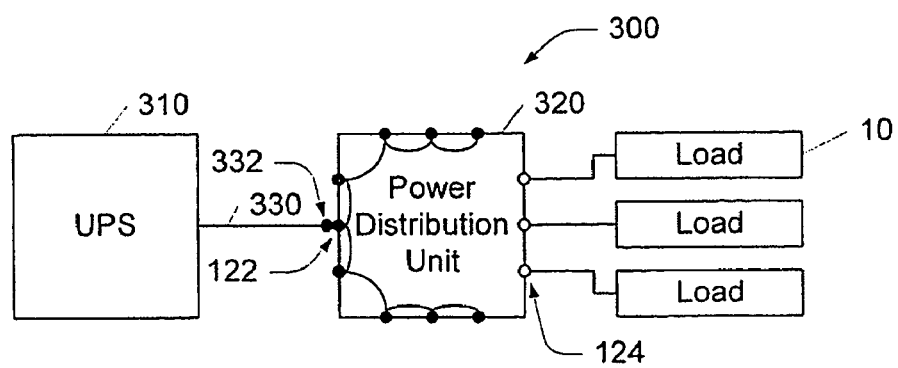

As shown in FIG. 3, in other embodiments of the present invention, a UPS 310 or other power source of a power distribution system 300 and a power distribution unit 320 having a plurality of interconnected guarded connectors 122 may be separate assemblies coupled by a cable 330 including a guarded connector 332 configured to mate with one or more of the guarded connectors 122. Connection of the cable 330 to the UPS 310 may also utilize guarded connectors. Loads 10 are connected to load terminals 124, e.g., receptacles, of the power distribution unit 320.

Figure 4:
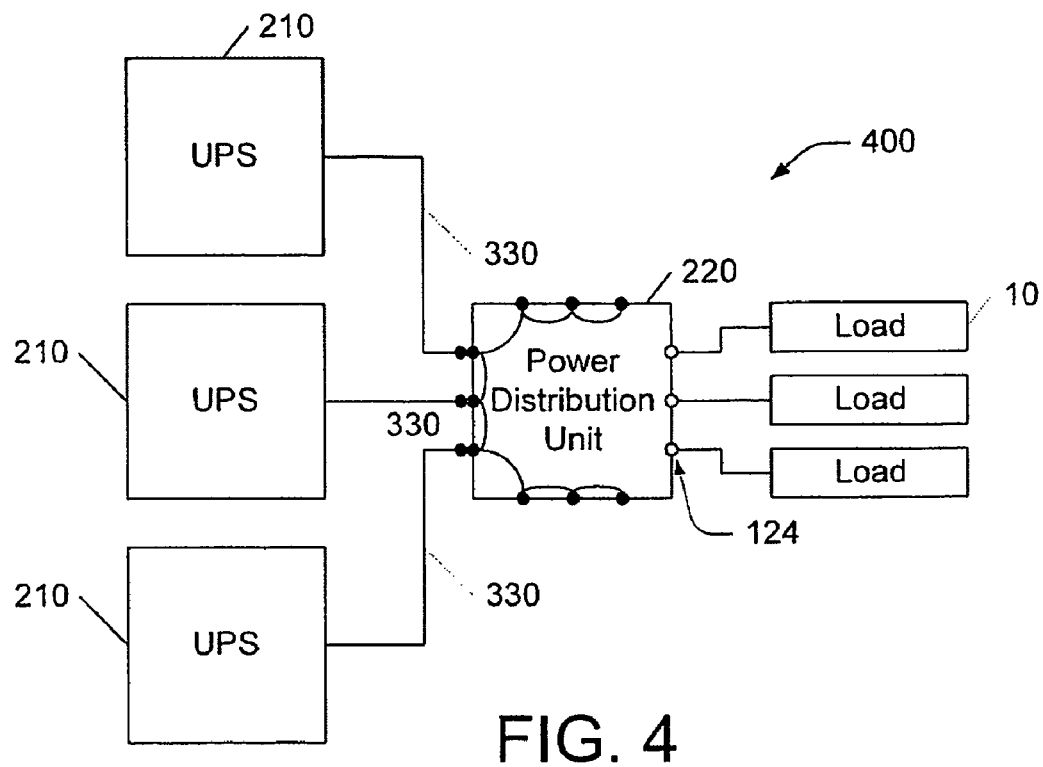
Figure 5:
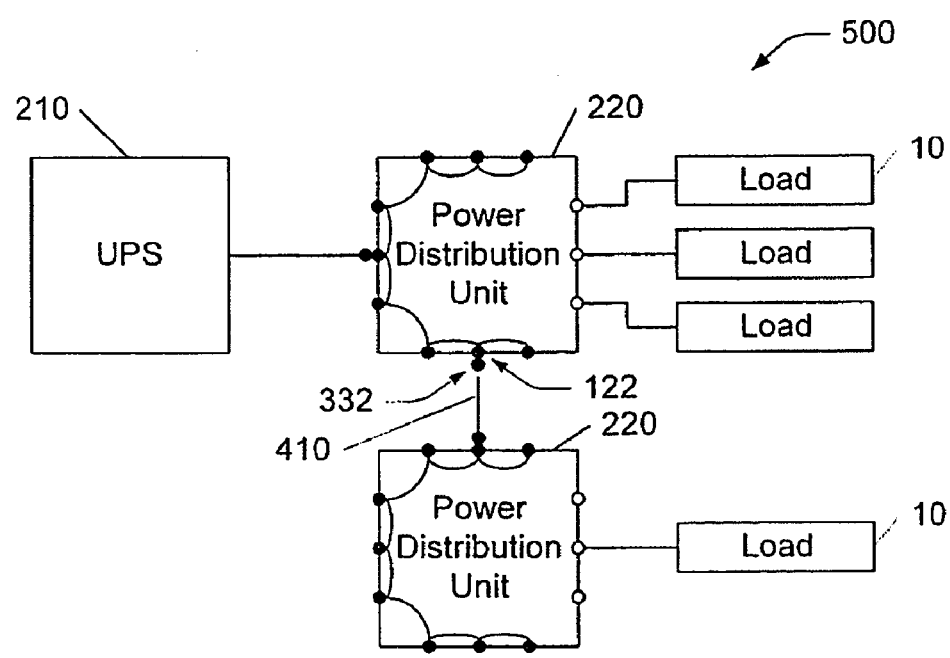
Figure 6:
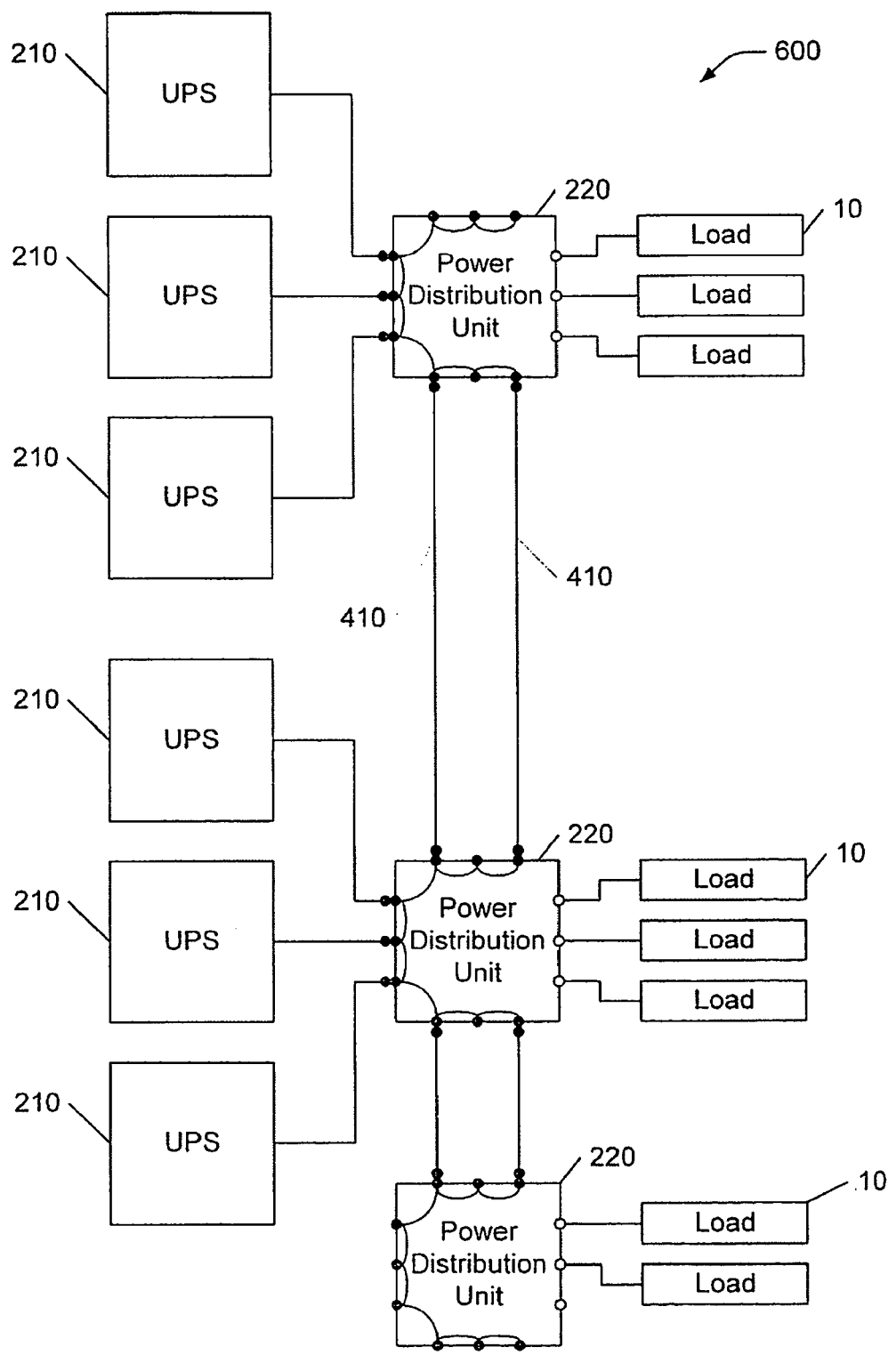
Figure 7:
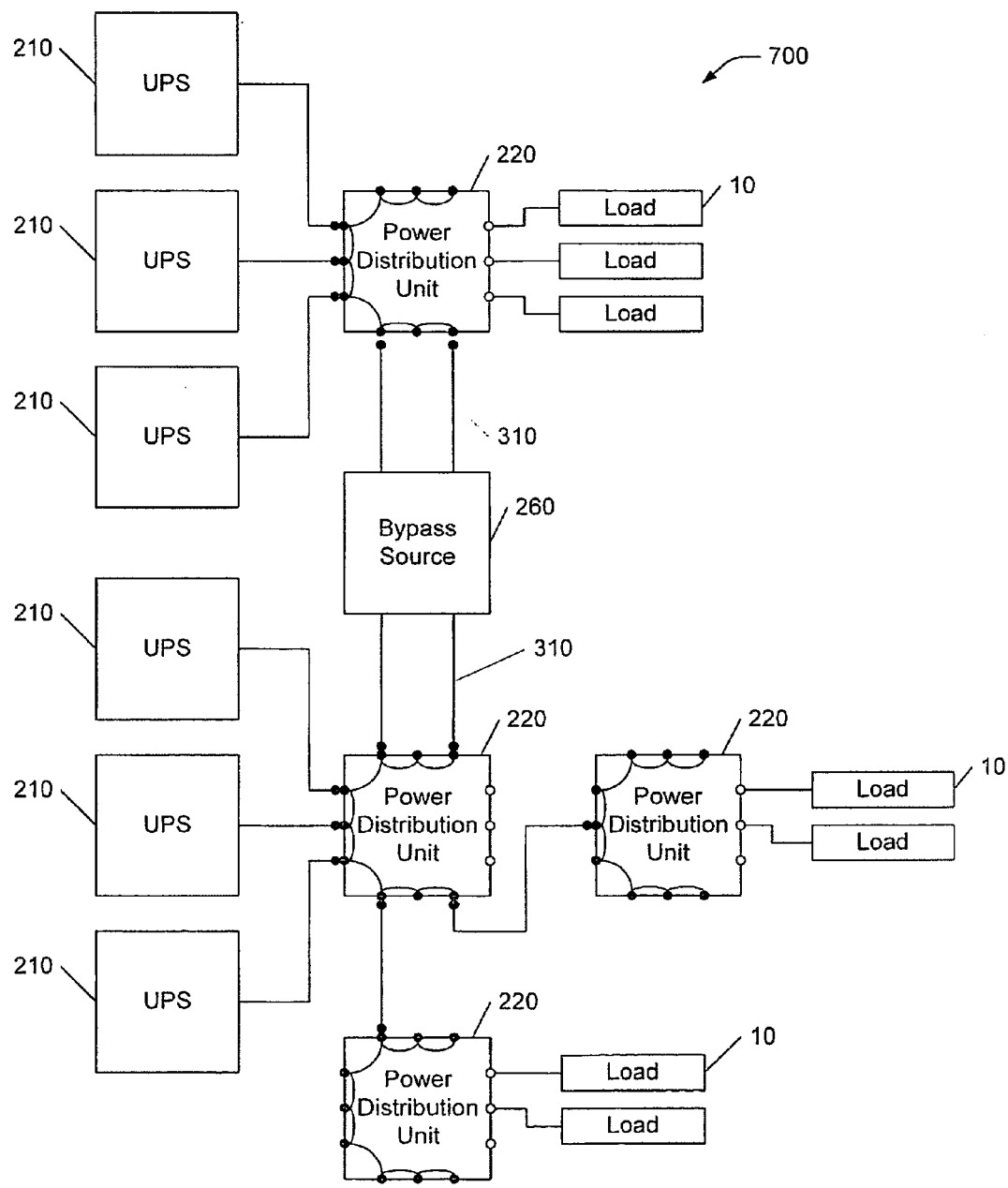

FIGS. 4-7 illustrate various other power distribution systems utilizing a modular, connectorized approach along the lines described above. FIG. 4 illustrates a power distribution system 400 that includes a plurality of UPSs 210 coupled to guarded connectors 122 of a power distribution unit 220 by respective cables 330 having guarded connectors 332 configured to connect with the guarded connectors 122 of the power distribution unit 220. FIG. 5 illustrates a system 500 in which first and second power distribution units 220 are interconnected at guarded connectors 122 thereof by a cable 410 including guarded connectors 332 configured to mate with the guarded connectors 122 of each of the power distribution units 220. FIG. 6 illustrates a system 600 in which respective sets of UPSs 210 are connected to respective power distribution units 220, which are, in turn, interconnected by cables 410. A third power distribution unit 220 is coupled to one of the other power distribution units 220. Another exemplary configuration is shown in FIG. 7, wherein a system 700 includes a hierarchical interconnection of power distribution units 220, with respective power distribution units 220 that are coupled to respective sets of UPSs 210 are also connected to a bypass source 260 by cables 310. It will be understood that connections to other types of power distribution components may be provided in other embodiments.

Figure 8:
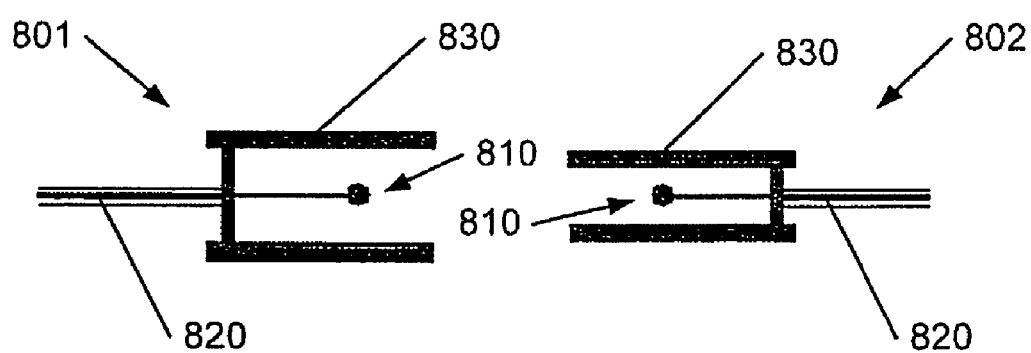
FIG. 8 illustrates a guarded connector for use in modular power distribution apparatus according to some embodiments of the present invention.

FIG. 8 schematically illustrates mating guarded connectors 801, 802 according to some embodiments of the present invention. Each of the connectors 801, 802 includes a conductive contact 810, which is electrically coupled to a conductor 820 (e.g., a cable conductor and/or internal wiring of an assembly) and surrounded by an isolating connector body 830. The connector bodies 830 are configured to provide openings sufficient to support mating of the contacts 810 while preventing contact by, for example, a finger, tool or other objects. It will be appreciated that either connector body 830 may include mounting members or other features that may be used, for example, to mount the connector body to a housing or chassis. The connector bodies 830 may also include keys or other features that constrain the connectors 801, 802 to mate with particular connectors and/or to prevent mating the connectors 801, 802 in particular orientations (e.g., wrong polarity).

Various embodiments of the present invention include a wide variety of configurations of power distribution units, power sources and/or cabling utilizing guarded connectors that facilitate installation and reconfiguration while allowing power supply to be maintained.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A power distribution unit comprising:
   a frame; and
   at least three interconnected and/or interconnectable first fingerproof connectors supported by the frame, respective ones of the first fingerproof connectors configured to mate with second fingerproof connectors of respective power distribution cables.

2. The power distribution unit of claim 1, further comprising a load terminal supported by the frame and connected or connectable to the first fingerproof connectors.

3. The power distribution unit of claim 1, wherein the first fingerproof connectors are configured to support hot plugging.

4. The power distribution unit of claim 1, integrated in a common assembly with a UPS having an output electrically coupled to the first fingerproof connectors.

5. The power distribution unit of claim 2, wherein the load terminal comprises a standard power outlet.

6. The power distribution unit of claim 2, wherein the load terminal is connected to the first fingerproof connectors by a selective coupling device.

7. The power distribution unit of claim 6, wherein the selective coupling device comprises a switch or circuit breaker.

8. A modular power distribution system comprising:
   a uninterruptible power supply (UPS); and
   a power distribution unit comprising at least three interconnected and/or interconnectable first fingerproof connectors connected and/or connectable to an output of the UPS, respective ones of the first fingerproof connectors configured to mate with second fingerproof connectors of respective power distribution cables.

9. The system of claim 8, wherein the power distribution unit further comprises a load terminal connected or connectable to the first fingerproof connectors of the power distribution unit.

10. The system of claim 8, wherein the UPS and the power distribution unit comprise respective first and second assemblies, and wherein the system further comprises a cable comprising a connector connected to a connector of the first assembly and a guarded connector connected to a guarded connector of the second assembly.

11. The system of claim 10, wherein the connector of the first assembly comprises a guarded connector and wherein the connector of the cable connected to the connector of the first assembly comprises a guarded connector connected to the guarded connector of the first assembly.

12. The system of claim 8, further comprising a cable coupling the output of the UPS to one of the guarded connectors of the power distribution unit.

13. The system of claim 12, wherein the UPS comprises a plurality of UPSs, and wherein the cable comprises a plurality of cables coupling respective ones of the plurality of UPSs to the power distribution unit, wherein a respective one of the cables comprises a guarded connector connected to a respective one of the guarded connectors of the power distribution unit.

14. The system of claim 9, wherein the power distribution unit comprises a first power distribution unit, and wherein the system further comprises:
   a second power distribution unit comprising a plurality of interconnected and/or interconnectable guarded connectors; and
   a cable comprising a guarded connector connected to one of the guarded connectors of the first power distribution unit and a guarded connector connected to one of the guarded connectors of the power second power distribution unit.

15. The system of claim 9, wherein the system further comprises a cable comprising a guarded connector connected to one of the guarded connectors of the power distribution unit and connector connected to a secondary power source.

16. The system of claim 9, wherein the UPS and the power distribution unit are integrated in a common assembly.

17. The system of claim 9, wherein the guarded connectors are configured to inhibit contact with conductor portions thereof when disconnected.

18. The system of claim 9, wherein the first fingerproof connectors are configured to support hot plugging.

19. The system of claim 9, wherein the load terminal comprises a standard power outlet.

20. The system of claim 9, wherein the load terminal is connected to the first fingerproof connectors by a selective coupling device.

21. The system of claim 20, wherein the selective coupling device comprises a switch or circuit breaker.

* * * * *